United States Patent [19]
Cloarec et al.

[11] Patent Number: 6,026,648
[45] Date of Patent: Feb. 22, 2000

[54] METHOD AND APPARATUS FOR COOLING THE CONTENT OF A VESSEL

[75] Inventors: Alain Cloarec, Longjumeau; Luc Gaffet, Ploemeur, both of France

[73] Assignee: L'Air Liquide, Societe Anonyme Pour L'Etude Et L'Exploitation Des Procedes Georges Claude, Paris, France

[21] Appl. No.: 09/080,348

[22] Filed: May 18, 1998

[30] Foreign Application Priority Data

Jun. 10, 1997 [FR] France .................................. 97-07165

[51] Int. Cl.[7] .................................................. F25D 17/02
[52] U.S. Cl. .................................. 62/64; 62/70; 62/373
[58] Field of Search .................................. 62/70, 64, 373

[56] References Cited

U.S. PATENT DOCUMENTS

| | | | |
|---|---|---|---|
| 3,672,182 | 6/1972 | Stowasser et al. | 62/70 |
| 3,925,048 | 12/1975 | Iung | 62/50.1 |
| 4,094,164 | 6/1978 | Cope . | |
| 4,476,686 | 10/1984 | Madsen et al. | 62/68 |
| 4,667,478 | 5/1987 | Jones, III | 62/52.1 |
| 5,595,865 | 1/1997 | Possanza et al. . | |
| 5,603,567 | 2/1997 | Peacock . | |

FOREIGN PATENT DOCUMENTS

| | | |
|---|---|---|
| 355519 | 2/1990 | European Pat. Off. . |
| 744578 | 11/1996 | European Pat. Off. . |
| 2485950 | 1/1982 | France . |
| 1430385 | 3/1976 | United Kingdom . |

*Primary Examiner*—Ronald Capossela
*Attorney, Agent, or Firm*—Burns, Doane, Swecker & Mathis, L.L.P.

[57] ABSTRACT

Method and plant for cooling a food mass contained in a vessel are provided. The method includes, supplying a cryogenic liquid from a source and injecting the cryogenic liquid into the food mass through a bottom portion of the vessel. The pressure of the injected liquid is greater than 3 bar, and is preferably between 5 and 15 bar.

32 Claims, 4 Drawing Sheets

METHOD AND APPARATUS FOR COOLING THE CONTENT OF A VESSEL

BACKGROUND OF THE INVENTION

1. Field of the Invention

The present invention relates to the field of cooling the content of a vessel using a cryogenic liquid.

It relates, in particular, to the cooling of food products in apparatuses of the blender, mixer or kneader type, it then being possible for the content of the apparatus to be solid or pasty, as is the case with meat, or else liquid.

2. Description of Related Art

Taking the example of meat blenders, it is known that there is considerable amount of literature regarding the use of liquid $CO_2$. In particular, liquid $CO_2$ is injected into the bottom part of the blender so as to improve the heat exchange conditions between the cryogenic liquid and the meat. Reference may be made, for example, to documents U.S. Pat. No. 4,476,686 and EP-744,578.

This use of liquid $CO_2$ in meat blenders has since formed the subject of very many industrial applications throughout the world which have made it possible, in hindsight, to clearly demonstrate the existence of a number of drawbacks associated therewith, among which mention may be made of one drawback of a technical nature and one drawback of an economic nature:

from a technical standpoint, difficulties have arisen in the case of certain products which, after cooling, undergo a subsequent cooking operation. For example, in a fryer the product undergoes a "popcorn effect" as commonly referred to by those skilled in the art, wherein the meat is seen to fragment or sputter during frying.

Without being completely elucidated, this phenomenon has been at least partially explained as resulting from gaseous $CO_2$ dissolved in the mass of meat.

From an economic standpoint, it should be pointed out that the sites where food products are processed traditionally employ several fluids, among which nitrogen, in one or more forms, including liquid form, is most commonly found.

It will therefore be understood that it would be a great advantage to replace liquid $CO_2$ (as we have seen, the source of the "popcorn" effect) and to use a single source of cryogenic liquid, for example liquid nitrogen, for the various operations carried out on the site. This therefore requires the possibility of using liquid nitrogen, as a replacement for the traditional liquid $CO_2$, in such operations as cooling the content of blenders, mixers and other kneaders.

However, it should be pointed out that liquid nitrogen, because of its very special properties (in particular those related to its very low temperature) poses technical difficulties in cooling operations, both with regard to obtaining good energy efficiency and good transfer of the sensitive heat of the gas and to ensuring good dispersion of the cryogenic liquid throughout the product mass, or else with regard to avoiding the negative consequences of a sudden cooling of the environment and of the treated product (risk of liquefaction of the oxygen in the air, undesirable deep freezing of the product or else the sticking of the product to be cooled to the walls of the blender or to the components for injecting the cryogenic fluid).

Documents GB-1,430,385 and EP-A-166,655 have already mentioned the advantage, in operations to cool liquid foods or detergent powders, by injecting liquid nitrogen into the bottom part of the vessel containing the product to be cooled.

Document EP-A-711,511 has also recently mentioned the problems associated with the use of liquid nitrogen in the bottom of food blenders and has proposed, by way of solution, separating the gas phase from the cryogenic liquid so as to inject a substantially neat liquid into the bottom of the blender and, advantageously using injectors in the form of rectangular slots.

It will be noted that this document solves the problem of any sticking of the product on the injectors and other pipes inside the blender by flushing them using the gas phase previously separated from the cryogenic liquid.

The studies carried out to a successful conclusion by the Applicant on this subject have shown that it is possible to solve the technical problems mentioned above and, in particular, to obtain excellent results both with regard to the homogeneity of the temperature reached in the product mass and with regard to eliminating the "popcorn" effect, as long as the cryogenic liquid is injected into the vessel at a significant pressure, this being at least 3 bar and preferably lying within the range of 5 to 15 bar.

Returning to the case of liquid nitrogen, these studies have therefore made it possible to demonstrate that it is advantageous here not to use the conventional low-pressure liquid-nitrogen storage tanks (the pressure being typically about 1.5 to 2 bar, or up to 3 bar), but rather the medium-pressure liquid-nitrogen storage tanks which specifically allow liquid nitrogen to be delivered at a pressure of greater than 3 bar.

It may be immediately noted that such a use of liquid nitrogen (or other cryogenic liquid) at high pressure may, from the thermal standpoint, seem to be extremely paradoxical (or even repugnant) to those skilled in the cryogenic art in such food cooling (refrigeration) applications.

This is because it should be considered that the temperature of liquid nitrogen under its conventional conditions of use (the pressure being typically about 1.5 to 2 bar) is about $-190°$ C., while at about 10 bar (the mid-point of the pressure range envisaged here), its temperature stabilizes to about $-180°$ C., hence a significant thermal loss (refrigeration).

However, it has thus been made possible to demonstrate a saving in the cycle time for cooling meat masses by switching from liquid $CO_2$ to pressurized liquid nitrogen (at a pressure of between 5 and 15 bar), allowing the cycle time to be reduced by half.

SUMMARY OF THE INVENTION

The method for cooling a food mass contained in a vessel (for example, an apparatus of the kneader, blender or mixer type), according to the invention, in which the cryogenic liquid is injected into the product mass in the bottom part of the vessel is characterized in that the pressure of the liquid injected is greater than 3 bar and preferably lying between 5 and 15 bar.

Although the invention applies very widely to any cryogenic substance used in its widest sense in liquid form from a liquid/vapor two-phase storage tank, which therefore includes liquid nitrogen, to liquid argon or even liquid oxygen, it applies most particularly and advantageously to the use of liquid nitrogen.

It will have been understood on reading the foregoing that the "cryogenic liquids" intended by the present invention exclude $CO_2$ for the technical and economic reasons already extensively discussed.

According to an advantageous way of implementing the invention, the cryogenic liquid is injected into the apparatus by means of at least one injection nozzle having a body which is cylindrical in shape and is surrounded over all or part of its length by a concentric tube, thus defining, between the body and the tube, an insulating annular space.

Although it will be possible to use an annular space filled with air, it will, nevertheless, be preferred to use an annular space filled with a material which is a poor conductor, like a polymer, such as Teflon® or a polyamide, or else, advantageously, a polyethylene, for example of the HD1000 type.

According to one of the advantageous ways of implementing the invention, the injection nozzle(s) are supplied with cryogenic liquid by at least one supply (distribution) manifold which is itself connected upstream to a source of the cryogenic liquid used, the manifold preferably lying in a position above the injection nozzle or nozzles.

It will have been understood on reading the foregoing that the method according to the invention can be used on apparatuses, of varied type and geometry, used in the industry for cooling products, wherein the product may or may not be agitated. For example, in single-trough blenders for which it will then be possible to place a single nozzle or series of nozzles on one of the sides of the blender, or else a nozzle or series of nozzles on each side of the blender. It is also possible to envisage the use of an apparatus having two troughs (like those which will be illustrated below in the context of the figures of the present application), for which it will be advantageous to employ, in each trough, an injection nozzle or series of injection nozzles.

As mentioned above, the present invention relies on the use of a cryogenic liquid at a significant pressure, since this has to be greater than 3 bar and preferably lies in the range of 5 to 15 bar. To do this, one of the simple solutions is to use, directly upstream, a medium-pressure liquid storage tank enabling this liquid to be delivered in the desired range.

Nevertheless, in order to take account, of constraints which may be local and associated with the user site in question (for example, because the site is already in possession of a low-pressure storage tank), it may be necessary to operate from an initial liquid storage tank which is not a medium-pressure storage tank but is a conventional low-pressure storage tank (the pressure being about 1.5 to 2 bar or reaching, although more rarely, 3 bar). In such a case, according to one of the possible ways of implementing the invention, using this initial low-pressure storage tank, the cryogenic liquid is transferred to an intermediate container which is pressurized using an injection of gas (for example, gaseous nitrogen in the case of a liquid-nitrogen storage tank) so as to be able to remove therefrom liquid at a higher pressure (typically within the required range of 5 to 15 bar), in order to be able to inject this pressurized liquid as required according to the invention into the bottom part of the vessel.

This solution, because of the fact that it employs a subcooled liquid, is relatively advantageous from an energy standpoint (despite the low pressure of the cryogenic liquid source used).

The method according to the invention may furthermore include one or more of the following characteristics:

the capacity (reserve) of the initial cryogenic liquid source used and the hourly consumption of cryogenic liquid employed in the vessel in order to obtain the desired cooling are such that it is necessary to replenish (recharge) the source at intervals allowing the stored cryogenic liquid to always be in a subcooled state;

a means is used, in the line between the cryogenic liquid source and the vessel, which makes it possible to limit two-phase injection into the vessel, such as a purger, a phase separator or a subcooler;

the line between the cryogenic liquid source and the vessel does not have means making it possible to limit two-phase injection into the vessel, such as a purger, a phase separator or a subcooler;

before or after the operation of cooling using a cryogenic liquid according to the invention, an operation of flushing all or part of the line between the cryogenic liquid source and the vessel is carried out using a flushing gas, for example an inert gas such as nitrogen;

during the operation of cooling using a cryogenic liquid according to the invention, one or more pauses are made which make it possible to carry out one or more operations of flushing all or part of the line between the cryogenic liquid source and the vessel using a flushing gas, for example an inert gas such as nitrogen (in such a case, one or more "cooling using cryogenic liquid/flushing using a gas" sequences are then carried out).

BRIEF DESCRIPTION OF THE DRAWINGS

Other features and advantages of the present invention will become more apparent in the following description which is given by way of illustration but which in no way implies limitation, with respect to the appended drawings in which.

DETAILED DESCRIPTION OF THE DRAWINGS

Figure 1:
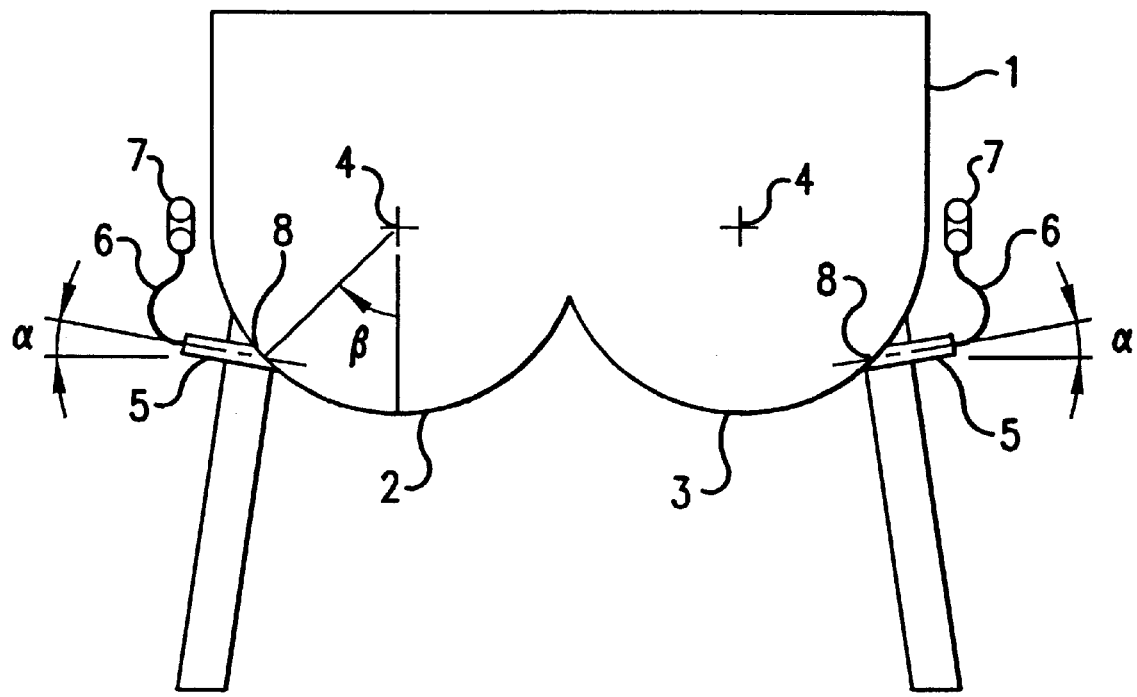
FIG. 1 is a diagrammatic representation of a blender (for example, a meat blender) having two troughs, employing, on each side of the blender, a series of nozzles for injecting liquid nitrogen into the bottom part of the blender according to the invention.

FIG. 1 shows the lower part of a blender (for example, a meat blender) having two troughs 2 and 3, for which a series of nozzles for injecting liquid nitrogen are used on each side of the apparatus.

Shown symbolically in the figure by the reference 5 are the nozzles for injecting the cryogenic liquid, these nozzles being connected to the wall of the blender, the nozzles themselves being supplied via hoses 6 by a supply and distribution manifold 7 which is advantageously positioned, as is the case in this FIG. 1, in a position above the injection nozzles.

The structure of the manifolds 7 will be explained in detail below in the context of FIG. 2, while the structure of the injection nozzles 5 will be explained in detail below in the context of FIG. 5 and FIG. 6.

In order not to clutter up the figure unnecessarily, simple crosses have been used, at the reference 4, for the axes of the rotor shafts of the blender—one shaft per trough of the blender—as shown in FIG. 1.

As may be observed on examining this FIG. 1, the position (the angle beta) of the injection nozzles along the wall of each trough and the inclination (the angle alpha) of each injection nozzle with respect to the horizontal have, here, advantageous values for the purpose, on the one hand, of preventing the path of the jet of cryogenic liquid from crossing the shafts and the rotors of the blender (and to avoid running the risk of creating cold spots), while at the same time involving a maximum portion of the product mass to be cooled that is contained in the blender, but also, on the other hand, by inclining the injection nozzle with respect to the horizontal, of preventing, when subsequently cleaning the blender with water, this water from being able to run up into the cryogenic-liquid supply line.

It has thus been found that an angle beta of about 45° with respect to the vertical gives very good results and that an angle alpha of at least 10° with respect to the horizontal is a setting which it is advantageous to adopt.

Figure 2:
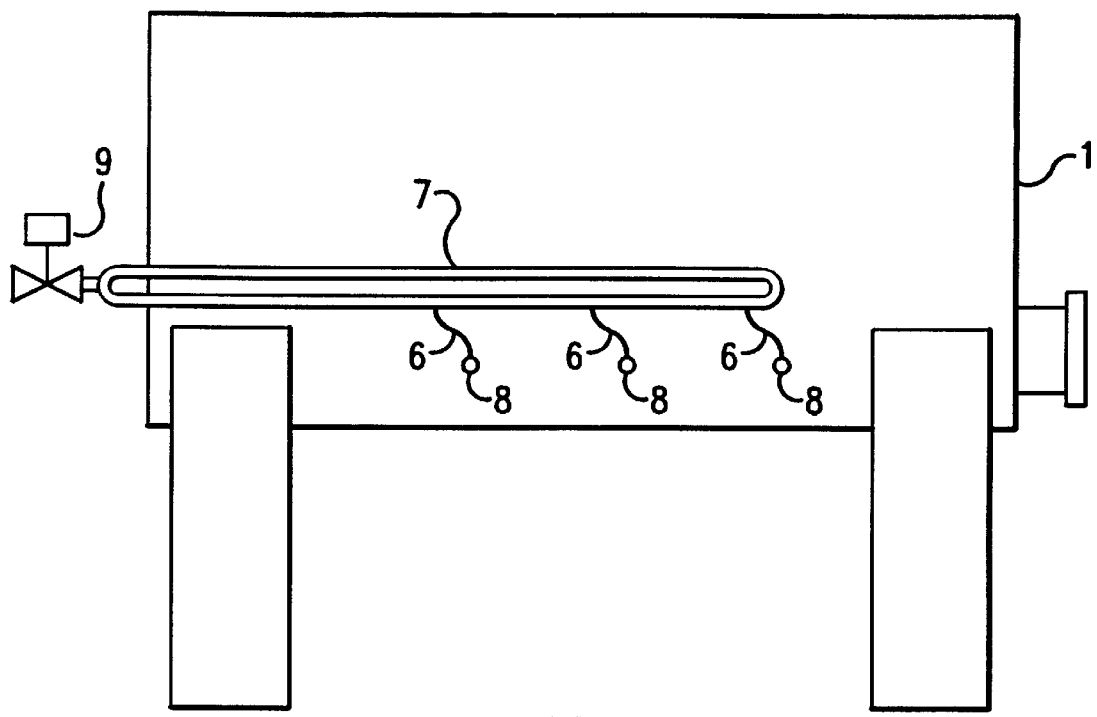
FIG. 2 is a detailed view of the injection manifold on each side of the blender shown in FIG. 1.

FIG. 2 shows a side view of the blender 1, making it possible to see more clearly one of the distribution manifolds 7 which can be used for supplying the various injection points 8 in the wall of the blender with liquid nitrogen via hoses 6.

For the sake of simplicity, the injection nozzles 5 connected to the points 8 have not been shown in detail here.

As will be clearly apparent to those skilled in the art, a situation has been illustrated here (FIGS. 2 and 3) in which there are three injection points provided on each side of the blender, but, of course, the number of injection points, as well as their position on the wall (angles $\alpha$ and $\beta$) must, in each case, be determined according to the size of the blender, the product mass to be treated or the temperature difference to be achieved at the end of the treatment.

As may be seen on examining FIG. 2, the supply manifold 7 does not consist here of a simple straight pipe to which the hoses 6 are connected but adopts a structure which is somewhat more elaborate and advantageous in order to allow the flow of liquid nitrogen to be distributed as uniformly as possible over all the hoses, in particular by preventing one or other of the hoses from receiving a very small amount of fluid compared to that which the other hoses receive: in this case, the manifolds have a structure in the form of a circuit which is closed in a circular fashion at its two ends, this structure being supplied at one of its ends via a solenoid valve 9 and the hoses 6 being connected to the lower straight portion of the manifold.

Figure 3:
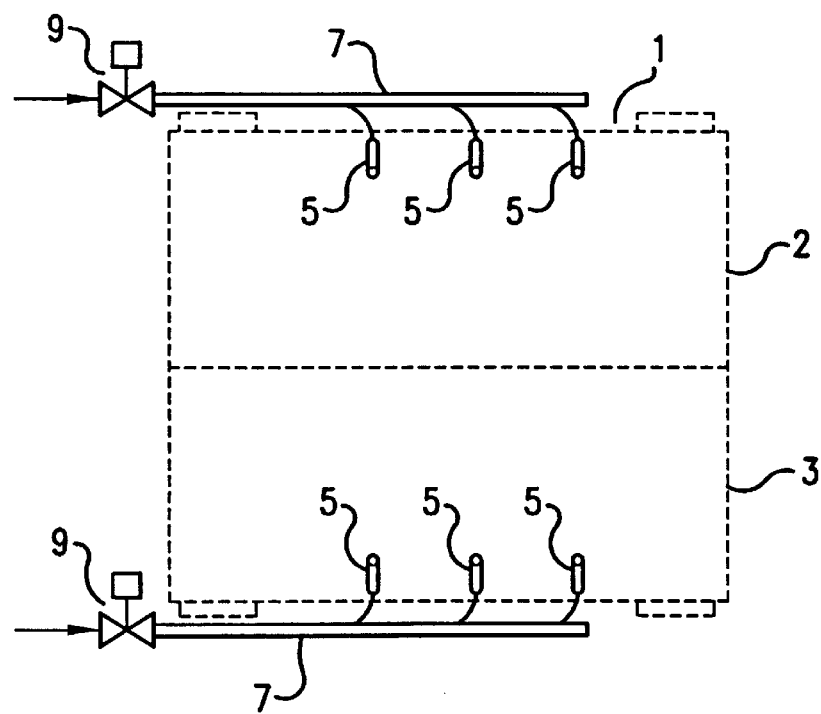
FIG. 3 is a diagrammatic top view of the blender shown in FIG. 1.

As regards FIG. 3, this enables the top of the two supply manifolds 7 to be seen more clearly, each being positioned on each side of the blender and each supplying three injection points via three injection nozzles 5.

The use of a solenoid valve 9, as a valve for controlling the flow supplying each manifold, is most particularly advantageous in order to be able to supply the manifold in a sequenced manner. This results in being better able to avoid the formation of cold spots on the wall of the blender.

Moreover, although the embodiment shown here has one solenoid valve per manifold (and therefore one solenoid valve for three injectors), it will be understood that it is also possible, without departing form the scope of the present invention, to place one solenoid valve per injection point, just upstream of the injector.

This configuration, with one or more decentralized solenoid valves, may prove to be advantageous in some cases, for example in order to prevent moisture coming from the apparatus or vessel from getting too far back up the line. To be sure, this "multiple solenoid valve" solution proves to be more expensive, but it can allow impaired operation by using fewer injectors in service should one or other of the solenoid valves not be operational as a result of a technical problem.

Figure 4:
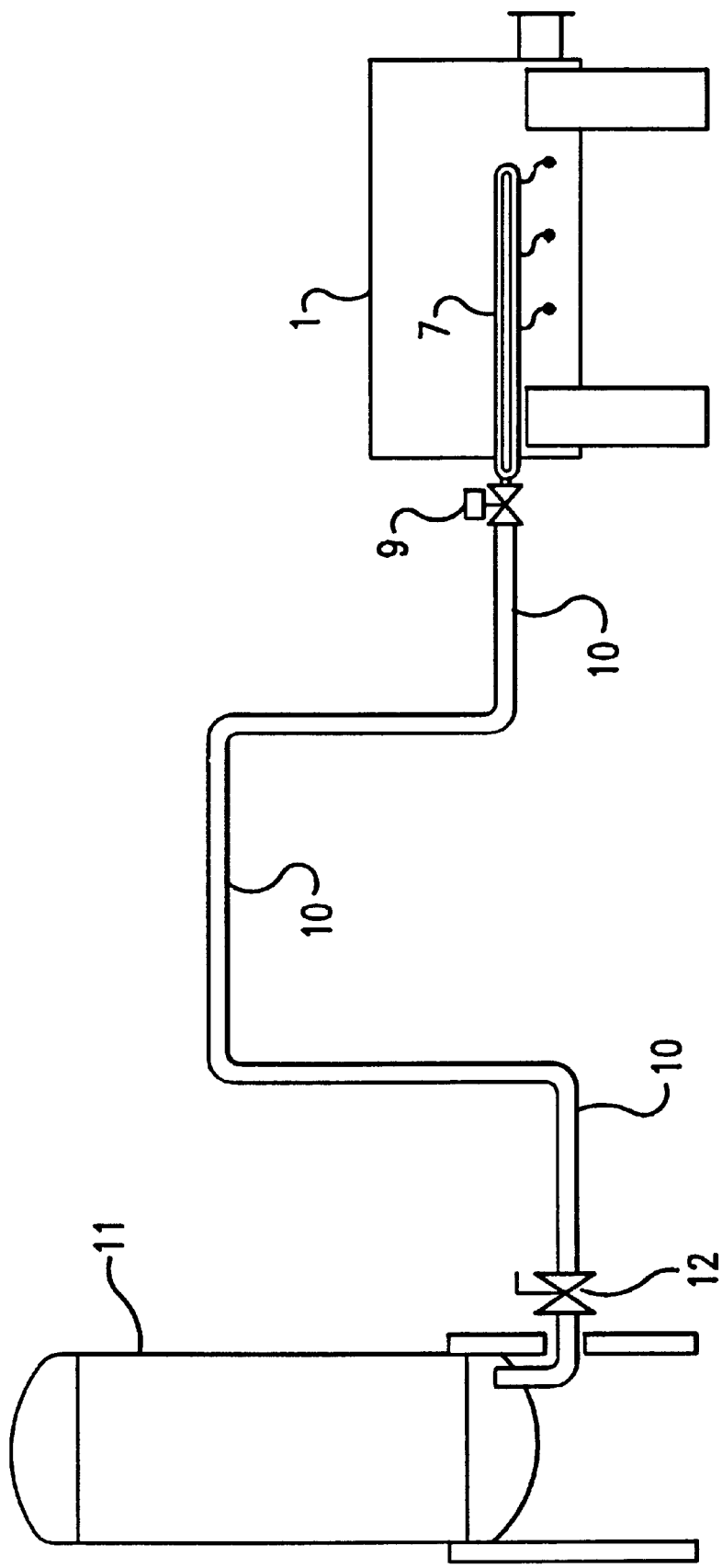
FIG. 4 is an overall diagrammatic representation of a plant suitable for implementing the invention.

As regards FIG. 4, this provides a more general view of a plant suitable for implementing the invention, in which may be seen a medium-pressure liquid-nitrogen storage tank 11 (at a pressure lying, for example, within the advantageous pressure range of 5 to 15 bar) to which is connected, via a shutoff valve 12, a transfer line 10 which serves to feed the liquid nitrogen to one or more supply manifolds of the blender 1.

The transfer line 10 is an insulated line capable of transferring a cryogenic liquid, such as a line known per se by those skilled in the handling of gases.

Not shown in the line, for the sake of simplicity, are the means making it possible to limit two-phase injection into the vessel, which means may be advantageous in some circumstances (depending on the local configuration but also depending on the product to be cooled). However, it will be understood that these means are well known to those skilled in the handling of gases, in particular those skilled in the use of cryogenic lines, such means including, in particular, purgers, phase separators or else subcoolers (liquid-nitrogen baths through which the cryogenic-liquid pipe runs so as to subcool the cryogenic liquid and thus to compensate for any heat influx).

It remains the case, however, and this is one of the significant advantages of the present invention compared to the characteristics of the method reported in the abovementioned document EP-744,578, that the use according to the present invention of means in the line making it possible to limit two-phase injection into the vessel is, in the vast majority of cases, not necessary.

This is because the pressure conditions (and the flow rate conditions generally necessary for a given user site) employed allow the line to be cooled much more rapidly than usual: at low pressure, a line may usually take ½ hour to cool down while here, at high pressure, the line takes at the very most two minutes to cool down and a substantially neat liquid is obtained at the end of the line where it enters the vessel.

Figure 5:
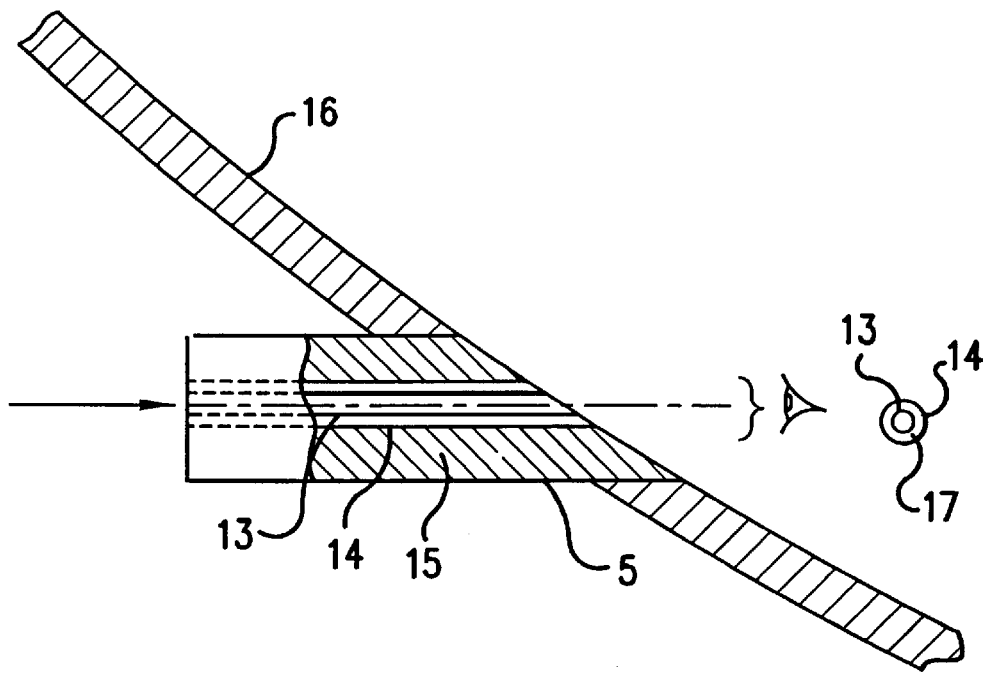
FIG. 5 is a detailed view in longitudinal section of a nozzle for injecting the cryogenic liquid according to the invention.

FIG. 5 shows an example of an injection nozzle 5 according to the invention, this being connected to the wall 16 of the blender 1, and therefore being in the form of a cylindrical body 13, surrounded over all or part of its length by a concentric tube 14, thus defining, between the body and the tube, an insulating annular space 17 advantageously filled with a polymer material.

This figure has been intentionally centered on the actual nozzle, and therefore the manner in which it is supplied with cryogenic liquid, for example via a hose, has not been shown.

Moreover, the injector 13 is surrounded by an external insulating sleeve 15, for example made of metal.

Figure 6:
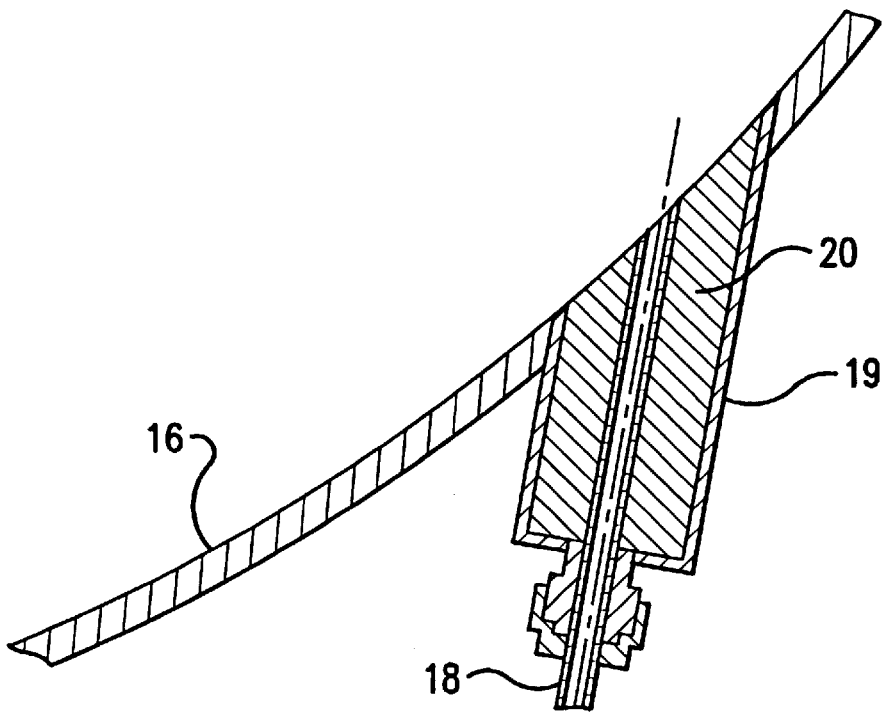
FIG. 6 is a detailed view in longitudinal section of another embodiment of a nozzle for injecting the cryogenic liquid according to the invention.

FIG. 6 shows another example of an injection nozzle according to the invention, connected to the wall 16 of the blender and being in the form of a cylindrical metal injection tube 18 surrounded over part of its length by a concentric metal tube 19, defining, between the two tubes, an insulating annular space 20 filled, in respect of the embodiment shown, with a polyethylene of the HD1000 type.

A plant such as that illustrated with regard to FIGS. 1 to 3 was used to implement the method according to the invention for the purpose of cooling masses of ground meat using liquid nitrogen, replacing the liquid $CO_2$ conventionally used previously, injected into the bottom part of a blender-type apparatus.

The raw material used was ground beef (relatively coarsely ground) containing 15% fat, which had to be cooled in the blender before the subsequent shaping and deep freezing operations.

The meat arrived in the blender at an initial temperature of about 3° C. since it came from a cold room.

The capacity of the blender was about 1 tonne of meat.

As indicated previously with reference to FIGS. 1 to 3, a series of 6 nozzles for injecting liquid nitrogen into the bottom part of the blender—3 nozzles for each trough of the blender—was therefore used.

The pressure of the cryogenic liquid injected was about 10 bar.

It was therefore possible to test masses of meat ranging from about 600 kg to one tonne, in each case taking care to measure the initial temperature (about 3° C.) of the incoming meat, its final temperature, the consumption of liquid nitrogen for carrying out the operation (expressed below in liter per kg of meat) and the temperature of the extracted cold gases (recovered in the top part of the blender).

The results obtained may be summarized in the following manner:

a final meat temperature of about −1.2° C., for a low consumption of liquid nitrogen since this was on average about 0.2 to 0.5 liters per kilo of meat treated (the consumption of carbon dioxide under these same conditions would be about 0.35 kg per kg of meat);

a very uniform output temperature over the entire mass of meat treated;

the usual operators of the plant are not only satisfied by the quality of the products thus treated but do not find an appreciable difference when compared with a treatment conventionally carried out using $CO_2$;

the outlet temperature of the gases, which is about −50° C., proves that most of the specific heat of the gas was transferred (good performance in terms of heat transfer);

no clogging of the injectors was observed;

the "popcorn" phenomenon observed during any subsequent frying operation is greatly reduced or even entirely eliminated;

compared with cooling using liquid $CO_2$, a saving in the cycle time is observed which makes it possible, depending on the conditions chosen, to halve the cycle time;

taking into account the number (2) of blenders on site, the consumption of the site (20,000 liters/day of liquid nitrogen for the two blenders)and the capacity (50,000 liters) of the nitrogen storage tank used, the storage tank had to be restocked every day or every day and a half, the cryogenic liquid which is stored therein therefore is [sic] always in a subcooling situation.

What is claimed is:

1. Method of cooling a food mass contained in a vessel, comprising supplying a cryogenic liquid from a source and injecting said cryogenic liquid into the food mass through a bottom portion of said vessel, wherein the pressure of the injected liquid is greater than 3 bar, and wherein said cryogenic liquid is not carbon dioxide.

2. The method according to claim 1, wherein the pressure of said injected liquid is from 5 to 15 bar.

3. The method according to claim 1, wherein the cryogenic liquid is injected into said vessel through at least one injection nozzle having a cylindrical body which is surrounded over all or a portion of its length by a concentric tube, wherein an insulating annular space is defined between said body and said concentric tube.

4. The method according to claim 3, wherein said at least one injection nozzle is supplied with said cryogenic liquid through at least one distribution manifold disposed above said at least one injection nozzle.

5. The method according to claim 1, wherein said vessel is a kneader, blender or mixer, having a single trough, and wherein the cryogenic liquid is injected into the vessel through an injection nozzle or a series of injection nozzles, present on opposite sides of said trough.

6. The method according to claim 1, wherein said vessel is a kneader, blender or mixer, having two troughs, and wherein the cryogenic liquid is injected into the vessel through an injection nozzle or a series of injection nozzles, present on opposite sides of said vessel.

7. The method according to claim 1, wherein said cryogenic liquid is liquid nitrogen supplied from a medium-pressure source at a pressure of from 5 to 15 bar.

8. The method according to claim 7, further comprising recharging said source with the cryogenic liquid at intervals allowing said cryogenic liquid stored therein to be maintained in a subcooled stated.

9. The method according to claim 8, wherein a volumetric capacity of the cryogenic liquid source initially used and an hourly consumption of the cryogenic liquid employed in the vessel to perform said cooling are such as to require said recharging.

10. The method according to claim 1, wherein said cryogenic liquid is liquid nitrogen supplied from a low-pressure source at a pressure of from 1 to 3 bar, said liquid nitrogen being conveyed to said vessel by:
  directing said liquid nitrogen from a low-pressure storage tank to an intermediate buffer container;
  pressurizing said buffer container with gaseous nitrogen; and
  removing said pressurized liquid nitrogen from said intermediate buffer container to send it to at least one injection nozzle.

11. The method according to claim 10, further comprising recharging said source with the cryogenic liquid at intervals allowing said cryogenic liquid stored therein to be maintained in a subcooled stated.

12. The method according to claim 11, wherein a volumetric capacity of the cryogenic liquid source initially used and an hourly consumption of the cryogenic liquid employed in the vessel to perform said cooling are such as to require said recharging.

13. The method according to claim 1, wherein the cryogenic liquid is injected into the vessel intermittently.

14. The method according to claim 1, further comprising flushing all or a portion of a line connecting said cryogenic liquid source to said vessel using a flushing gas, before or after cooling said food mass.

15. The method according to claim 1, further comprising intermittently flushing all or a portion of a line connecting said cryogenic liquid source to said vessel using a flushing gas during the cooling of said food mass.

16. Plant for cooling a food mass contained in a vessel with a cryogenic liquid, comprising:
  a medium-pressure cryogenic liquid storage tank, for storing the cryogenic liquid at a pressure greater than 3 bar;
  at least one injection nozzle connected through a wall of a bottom part of said vessel for injecting the cryogenic liquid into the food mass contained in said vessel;

a transfer line for supplying said cryogenic liquid stored in said medium-pressure storage tank to said at least one injection nozzle, wherein said cryogenic liquid is not carbon dioxide.

17. The plant according to claim 16, wherein the cryogenic liquid is stored in said medium-pressure cryogenic liquid storage tank at a pressure of from 5 to 15 bar.

18. The plant according to claim 16, wherein said transfer line does not include means for limiting two-phased injection into the vessel.

19. The plant according to claim 16, wherein said transfer line is connected to supply the at least one injection nozzle through at least one distribution manifold disposed above said at least one injection nozzle.

20. The plant according to claim 19, further comprising at least one solenoid valve per manifold disposed immediately upstream of said manifold.

21. The plant according to claim 16, wherein each injection nozzle is formed by a cylindrical body which is surrounded over all or a portion of its length by a concentric tube, wherein an insulating annular space is defined between said body and said concentric tube.

22. The plant according to claim 21, wherein there is one solenoid valve per injection nozzle disposed immediately upstream of said injection nozzle.

23. The plant according to claim 16, further comprising at least one solenoid valve in said transfer line for supplying the cryogenic liquid to said at least one injection nozzle.

24. The plant according to claim 16, wherein the cryogenic liquid is nitrogen.

25. Plant for cooling a mass of material contained in a vessel with a cryogenic liquid, comprising:

a low-pressure cryogenic liquid storage tank for storing the cryogenic liquid at a pressure of from 1 to 3 bar;

at least one injection nozzle connected through a wall of a bottom part of said vessel for injecting the cryogenic liquid into the mass of material contained in said vessel;

a buffer container for intermediate storage of the cryogenic liquid;

a first transfer line connected at a first end to the low-pressure tank and at a second end to the buffer container;

means for pressurizing the cryogenic liquid stored in the buffer container to a pressure above 3 bar; and a second transfer line connected at a first end to said buffer container and at a second end to said vessel, for supplying said at least one injection nozzle with said cryogenic liquid, wherein said cryogenic liquid is not carbon dioxide.

26. The plant according to claim 25, wherein said means for pressurizing the liquid stored in said buffer container is effective for pressurizing said liquid to a pressure of from 5 to 15 bar.

27. The plant according to claim 25, wherein said second transfer line is connected to supply the at least one injection nozzle with the cryogenic liquid through at least one distribution manifold disposed above said at least one injection nozzle.

28. The plant according to claim 27, further comprising at least one solenoid valve per manifold disposed immediately upstream of said manifold.

29. The plant according to claim 25, further comprising at least one solenoid valve in said second transfer line for supplying the cryogenic liquid to said at least one injection nozzle.

30. The plant according to claim 29, wherein there is one solenoid valve per injection nozzle disposed immediately upstream of said nozzle.

31. The plant according to claim 25, wherein said second transfer line does not include means for limiting two-phase injection into the vessel.

32. The plant according to claim 25, wherein the cryogenic liquid is nitrogen.

* * * * *